Jan. 5, 1971 R. WEBER 3,552,020
DEVICE COMPRISING A MEASURING INSTRUMENT FOR RECORDING
THE INDIVIDUAL CHEWING MOTIONS OF A PERSON AND A
HINGE MECHANISM FOR GRINDING IN THE MASTICATION
CONTOUR OF ARTIFICIAL TEETH
Filed Oct. 26, 1965 4 Sheets-Sheet 1
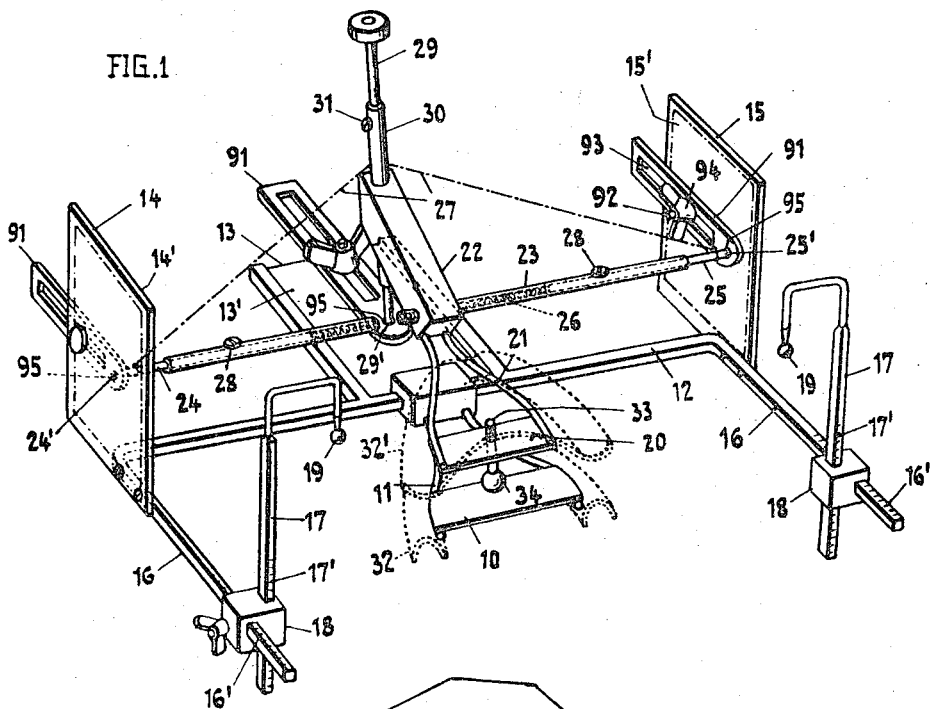
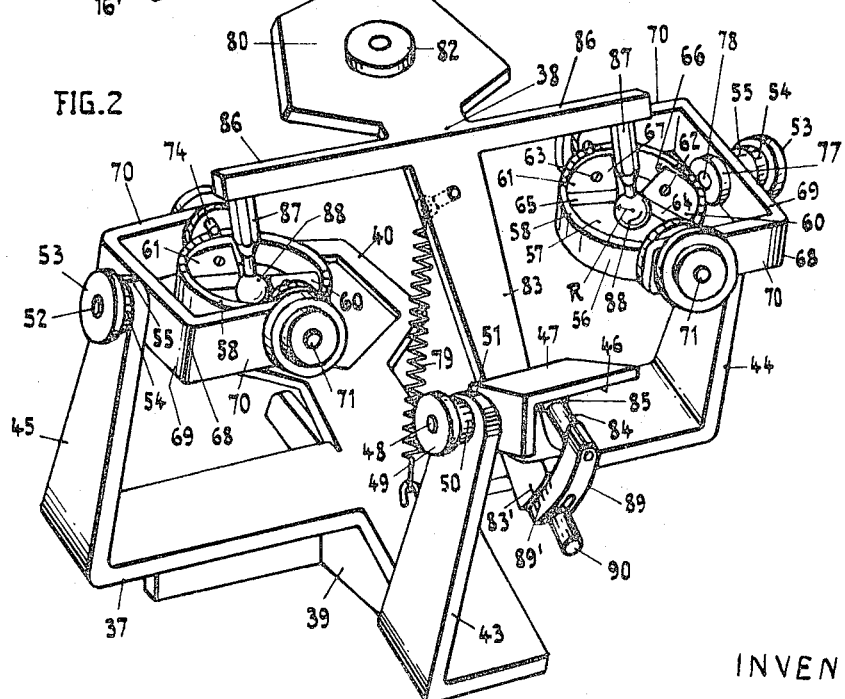
INVENTOR
ROLAND WEBER

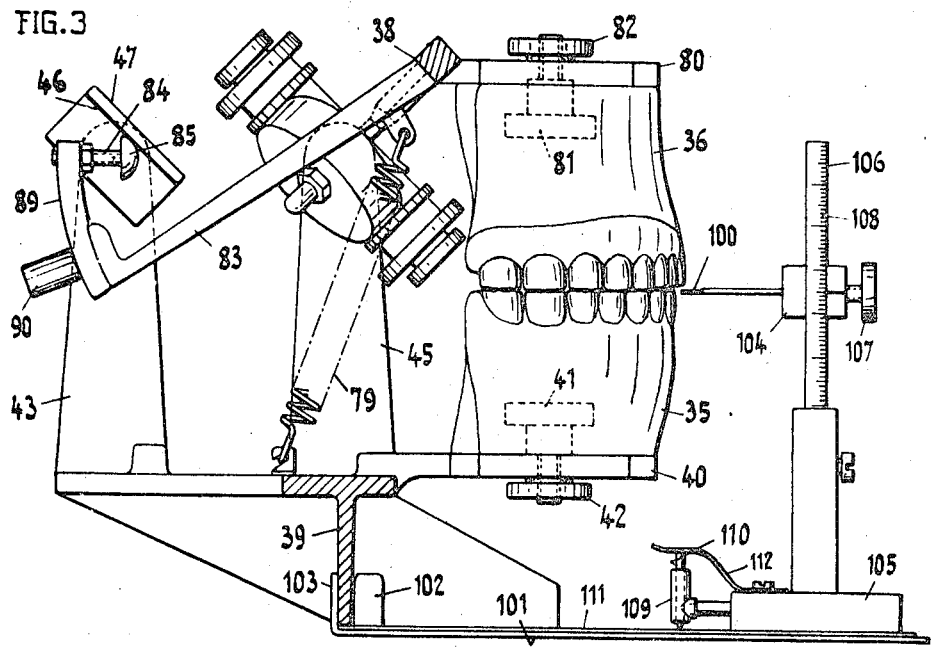
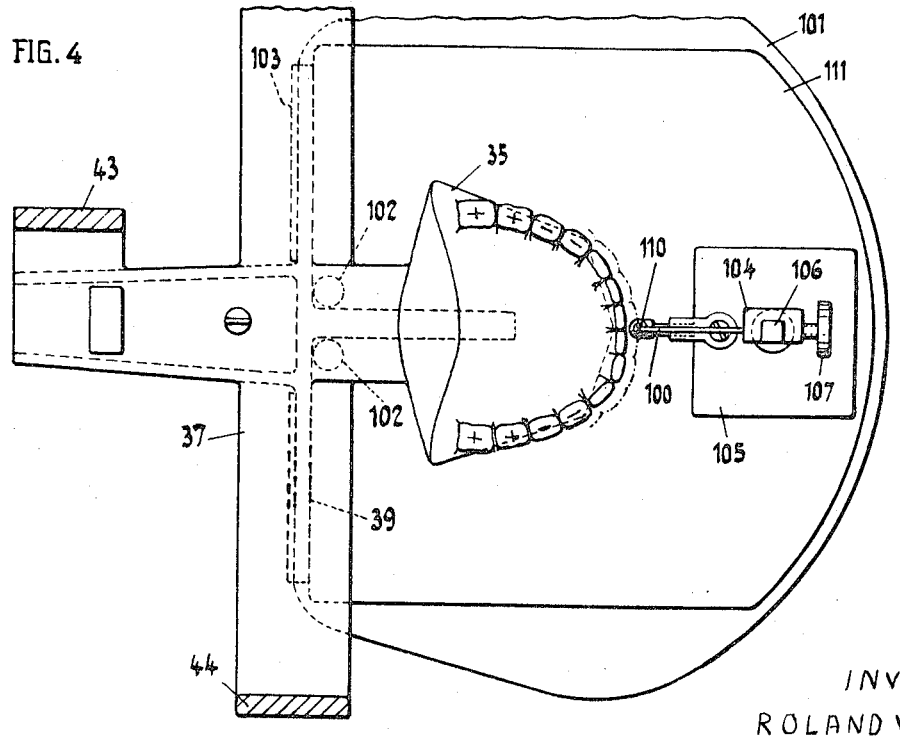

INVENTOR
ROLAND WEBER

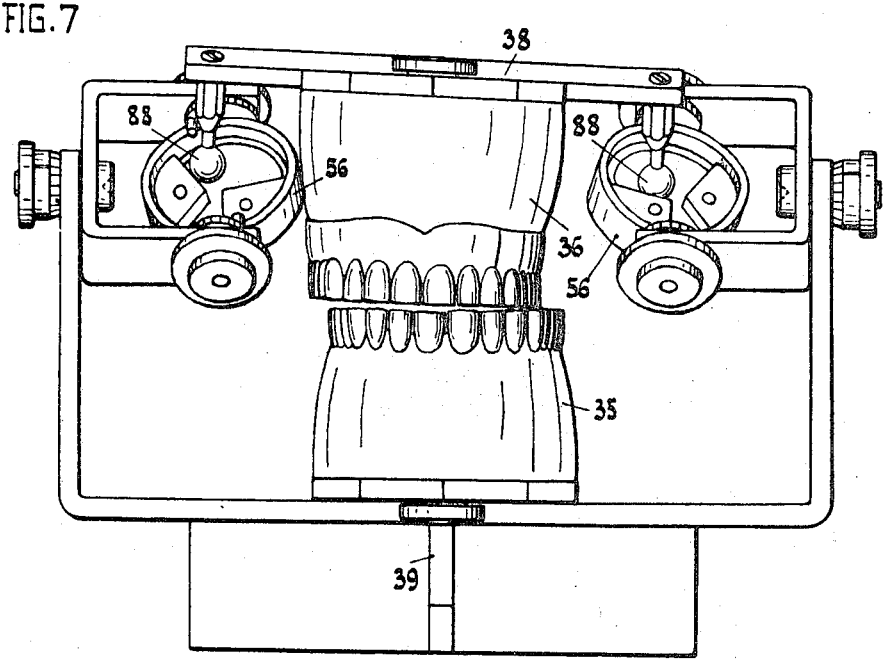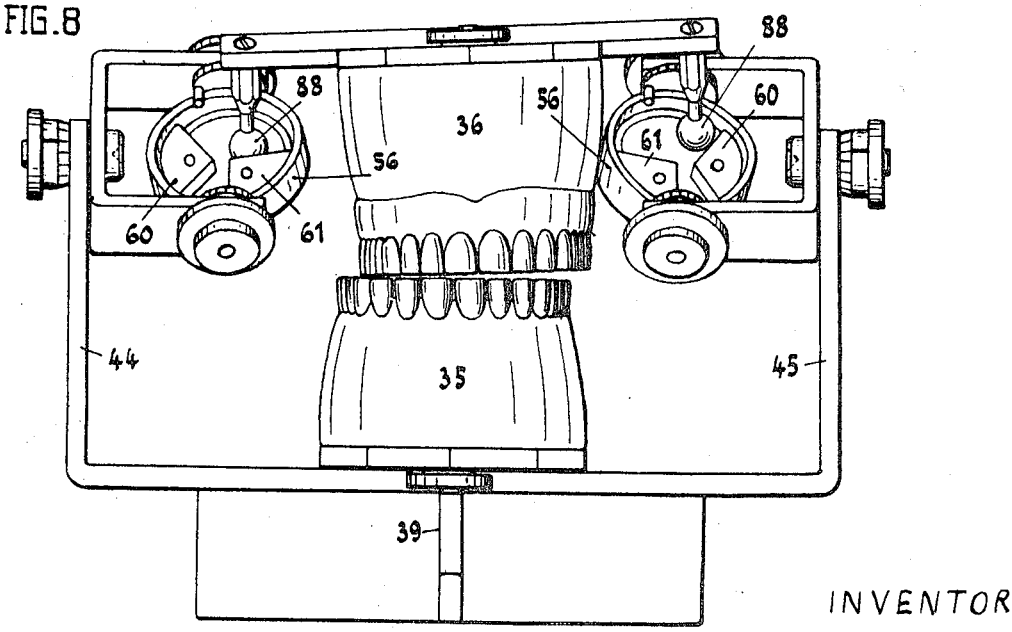

United States Patent Office 3,552,020
Patented Jan. 5, 1971

3,552,020
DEVICE COMPRISING A MEASURING INSTRUMENT FOR RECORDING THE INDIVIDUAL CHEWING MOTIONS OF A PERSON AND A HINGE MECHANISM FOR GRINDING IN THE MASTICATION CONTOUR OF ARTIFICIAL TEETH
Roland Weber, Place St. Francois 2,
Lausanne, Switzerland
Filed Oct. 26, 1965, Ser. No. 505,271
Int. Cl. A61c 11/00
U.S. Cl. 32—32                                  18 Claims

ABSTRACT OF THE DISCLOSURE

A device comprised of a measuring instrument for recording masticatory motions and a hinged mechanism for grinding the mastication contour into artificial teeth based on the recorded motions obtained by the measuring instrument. The measuring instrument contains means for recording the three-dimensional masticatory motions and also for determining the condylar axis of the lower jaw. The hinged mechanism contains a frame structure arranged to be aligned on the condylar axis by means of the measuring instrument with adjustably positionable guiding devices located on the frame structure by means of the recorded measurements from the measuring instrument for effecting the mastication contour.

SUMMARY OF THE INVENTION

The functional movements of dentures are composed of the hinged motions of the inferior maxilla and the intrinsic motions of the denture frames resiliently supported on the mucous membrane. As the following fundamental conditions are not fulfilled by and in connection with the hitherto existing measuring instruments for measurement or recording of these composite motions, the results are never reliable:

(1) Selection of the one denture base as a fixed reference or datum system, with respect to which the other denture base performs relative motions. The denture base assumed to be stationary is fastened to a holder for the recording of impression boards or cards in such manner that the said holder is entrained in the displacements of the denture base, wherein movements deriving from the resiliency of the mucous membrane are included, whereas a measuring bow or the like which is joined to the other denture base produces recordings on this reference system in the same conditions.

(2) The recording of the motions must occur automatically and in three dimensions, and the momentary recording points of the measuring bow must always define a plane in any position.

(3) Transmission of the recording in the laboratory to the hinged mechanism for the grinding in of the mastication contour of artificial teeth must be performed in such manner that the denture frames then firmly secured to the plaster casts or patterns precisely comply with the same displacement conditions recorded in three dimensions as determined on the patient by recording, whereby the resiliency of the mucous membrane is included.

The invention relates to a device comprising a measuring instrument having two parts displaceable relative to each other, for three-dimensional recording of the individual masticatory motions of a person, and a hinged mechanism having two copying units displaceable relative to each other for grinding in the appropriate mastication contour of artificial teeth, which hinged mechanism comprises guide elements for guiding the two copying units on each other.

The invention now provides a device which fulfills the above mentioned fundamental conditions in that during the recording operation, the two parts of the measuring instrument are each releasably secured to the corresponding denture base, and have three recording members each cooperating with a recording member, two of the recording members being guided in automatically displaceable manner on a straight line common to both, the whole having the purpose of producing a three-dimensional recording of the relative displacements or positions of the two denture bases including the effect of the resiliency of the mucous membrane, and of employing the recording for setting the guide members of the hinged mechanism by means of the measuring instrument.

Figure 5:
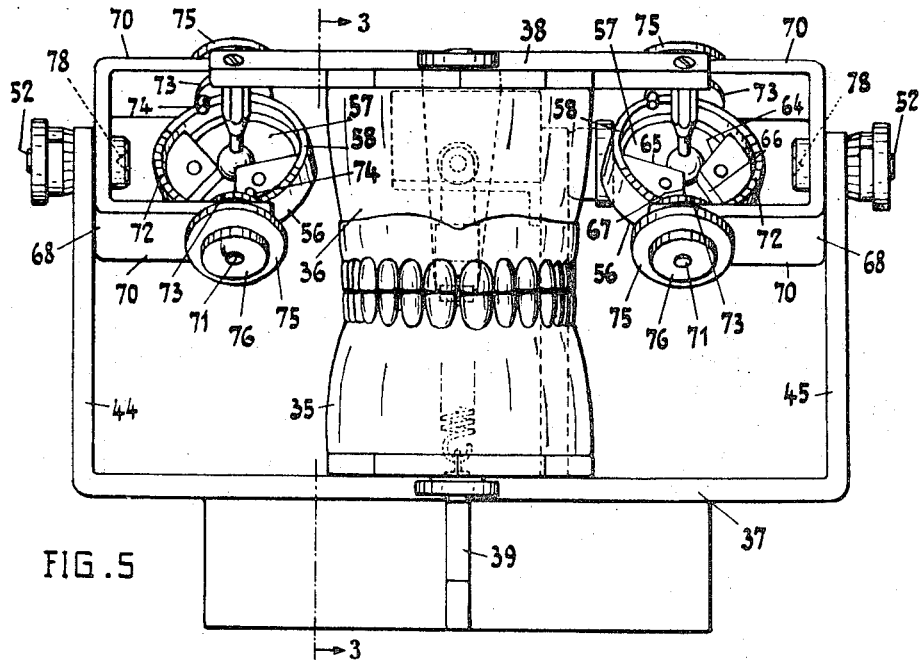
Figure 6:
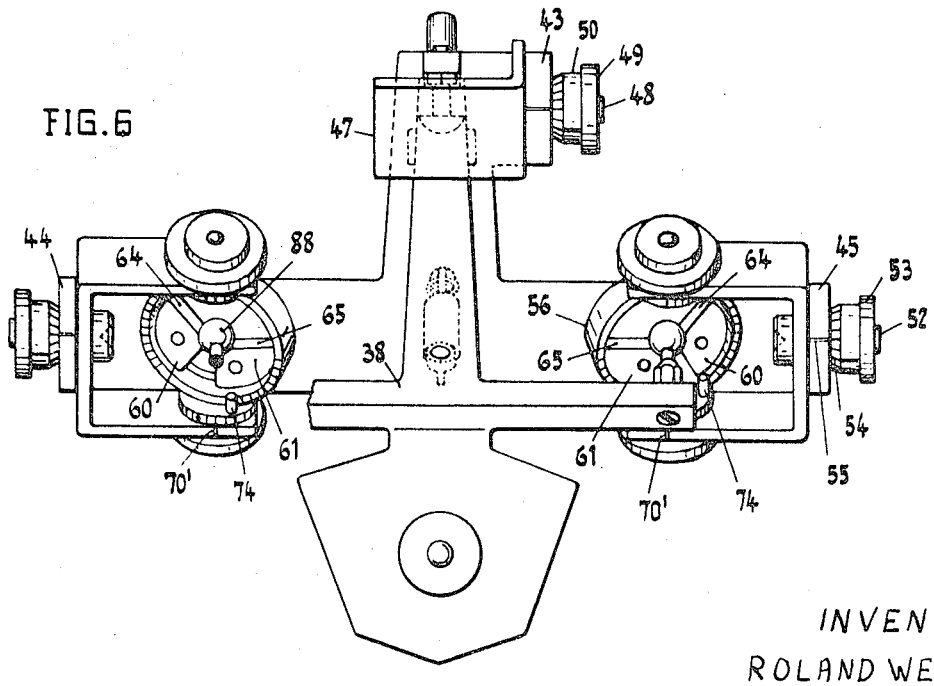

The device is described in detail in the following, in respect of an example of embodiment illustrated in the accompanying drawings, in which FIG. 1 is a perspective view of the measuring instrument, FIG. 2 shows the hinged mechanism in perspective view, FIG. 3 shows a vertical section of the hinged mechanism along line 3—3 in FIG. 5, FIG. 4 is a plan view of the lower part of the hinged mechanism, FIG. 5 is a front view of the hinged mechanism in the central occlusive position, FIG. 6 is a plan view to FIG. 5 with the upper part of the hinged mechanism partly broken away, and FIGS. 7 and 8 show the hinged mechanism in the two side biting positions on the right and on the left, respectively.

In the device illustrated in FIG. 1, the biting plate 10 of the denture base 32 for the lower jaw is releasably joined in rigid manner by a yoke 11 or the like to a U-shaped frame 12, on which are secured at the front and at both sides the corresponding card-holders 13, 14 and 15, carrying the recording cards 13', 14' and 15' inserted therein and each forming a plane (FIG. 1). The recording cards are translucent and their recording faces have a surface layer of a mixture of chalk and glycerin. On the two laterally situated shanks 16 of the frame 12 a rod 17 of rectangular section is mounted by means of a leading clamp 18 on each of the shanks 16 at right angles thereto, being displaceable on the shank and in its own longitudinal direction, and adapted to be locked in the desired position. The upper portion of the rod 17 is downwardly bent in U-shaped form and provided with a ball-shaped setting head 19. Due to the displaceability of the rods 17 the setting heads 19 may be set with their centers in a manner which remains to be described, into coincidence with the "condylar" axis of the lower jaw of a patient and then be locked by means of the clamps 18. The setting of the heads 19 may be read off on two respective scales 16' and 17' fitted on the corresponding rods 16 and 17. These parts form altogether the lower jaw recording frame.

The holding plate 20 of the denture base 32' for the upper jaw is releasably joined to a frame 21 (FIG. 1) by means of a yoke 22, on which frame two recording styli 24 and 25 are guided coaxially with respect to each other and at a right angle with respect to the median plane in a horizontal guide tube 23, whereof the recording tips 24' and 25' are pressed in opposite directions against the recording cards 14' and 15' of the frame 22 by a coil spring 26 situated in the tube 23. The two styli 24 and 25 are interconnected near their tips by a drawstring 27, so that a pull on the latter transversely to the tube 23 lifts the styli off the recording cards 14' and 15', being automatically pushed towards the recording cards again and held in recording contact with the same by the spring 26 after release of the string 27. The recording styli 24 and 25 can be locked each by a screw 28 being screwed into the tube 23 transversally thereto. A third recording stylus 29 is guided in a tube 30 mounted vertically on the frame 23, in the median plane, and can bear under its own weight on the recording card 13' with its recording tip and be locked by means of a screw 31 screwed into the tube 30. Each recording stylus has an aluminum tip.

The biting or impact plate 10 and the top jaw plate 20 are firmly secured in the corresponding denture bases 32 and 32' made in conventional manner of thermoplastic material, and their distance from each other in the patient's mouth, being the so-called biting height or clearance, is set in manner known per se by means of a set screw 33 screwed into the top jaw plate 20 and bearing with the ball-shaped head 34 against the biting plate 10. For recording purposes, the denture base 32 having the biting plate 10 (secured) on the yoke 11 of the frame 12, and the denture base 32' having the top jaw plate 20 rigidly mounted on the yoke 21 of the frame 22, are inserted into the patient's mouth.

The recording operation is performed initially with the recording styli 24 and 25 retracted, only by means of the stylus 29 on the card 13' with the jaws in occlusion, i.e. with the top jaw plate 20 resting on the biting plate 10 with the ball-head 34 in order to determine the apex of the central occlusive position of the jaws, namely the apex of the so-called gothic arch. In this central occlusive position, the styli 24 and 25 are allowed to impinge on the cards 14' and 15', and the jaw motions whilst biting on the right and on the left are then recorded on all three cards 13', 14' and 15' in the form of unbroken lines. The frontal chewing motion is also recorded in analogous manner. Any optional jaw position may however also be recorded by punctiform recording at the instant in question. Allowance is made for the resiliency of the maxillary mucous membranes in all these recordings. In the central occlusive position, the ball-shaped setting heads 19 are moreover so adjusted at either side of the patient's head that the extension of the "condylar" axis passes practically through the centers of the setting heads 19, whereupon the same will be locked by means of the leading clamps 18.

The denture ba ses 32 and 32' which were made after taking impressions of the lower jaw cast 35 and top jaw cast 36 (FIG. 3) normally made of plaster, are secured to the corresponding patterns 35 and 36 after recording is completed, by means of adhesive wax or the like, the corresponding pattern thereby being rigidly secured to the appropriate lower jaw recording frame 12 and top jaw recording frame 22.

The hinged mechanism (FIGS. 2–8) comprises a separate lower part 37 and upper part 38, which are arranged to support the lower and upper jaw patterns 35 and 36 respectively. To this end, the lower part 37 has a supporting plate 40 arranged on a cross-shaped foot 9 on which plate the lower jaw pattern 35 is releasably secured by means of a screw 41 plastered therein and a nut 42 (FIG. 3). The foot 39 is beveled towards its rear end so that the lower part 37 can be used in a correspondingly inclined position. The lower part 37 is provided with an arm support 43 at the rear end of the foot and two arm supports 44 and 45 on either side, all three arm supports extending upwardly and carrying each a guiding device adjustably secured thereon. The three guiding devices are formed and arranged for supporting and guiding the upper part 38 of the hinged mechanism and are described in the following.

The guiding device disposed on the upper end of the rear arm support 43 (FIGS. 2 and 6) is formed by a guide plate 47 endowed with a plane guide face 46 which slopes downwards towards the rear with the guide face and is mounted on a horizontal spindle 48 situated parallel behind the guide face and pivoted in the arm support 43 for being swivellable. The plate 47 can be locked on the arm support in any swivelling position by means of the screw nut 49 screwed on the projecting end of the spindle 48. A scale ring 50 secured on the spindle 48 allows to read the degree of inclination of the guide face 46 at a reading mark 51.

The other two guiding devices are pivotally mounted each on the upper extremity of the two lateral arm supports 44 and 45, respectively, in equal manner each by means of a spindle 52 penetrating the arm support and being lockable on the latter by a screw nut 53 screwed on the projecting outer end of the spindle 52. The two spindles 52 are arranged in axial alignment and parallel to the horizontal spindle 48. A scale ring 54 secured on each spindle 52 allows to read the degree of inclination of the guiding device as a whole at a mark 55. Each of these guiding devices (FIGS. 2, 3 and 5–8) comprises a circular plate 56 having a plane upper guide face 57 and an annular boundary 58 projecting thereabove. Inside along the boundary and surrounding the guide face 57 is an annular groove 59 by which the guide face is partly undercut and in which two guide segments 60 and 61 are swivellable about the axis of the circular plate 56 and immobilisable each in any position of rotation by means of a screw 62, 63 respectively. Each segment 60, 61 respectively has a plane guide face 64, 61 respectively at right angles to the guide face 57, the guide faces 64 and 65 in each instance always being set apart by a constant distance R from the axial plane passing through the axis of the plate and parallel to them, whereas a second delimiting face 66, 67 respectively of the segment 60, 61 respectively lies in an axial plane in each case.

Each circular plate 56 is swivellably mounted by means of two coaxial pivots 71 in the two shank portions 70 of a U-shaped frame 68, the middle portion 69 of which is secured on the horizontal spindle 52, the common axis of the two pivots 71 being parallel to the guide face 57 at the distance R above the same and at a right angle to the axis of the horizontal spindle 52. The pivots 71 are threaded for being axially adjustable in the shank 70 and allowing thus to displace the plate 56 slightly in this axial direction.

The setting of the guide faces 64 and 65 of the segments 60, 61, respectively on the plate 56 may be read off, by the intermediary of the axial face 66, 67 respectively on a scale 72 contrived on the rim 58 of the plate. The two terminal positions of the guide face 57 of the swivellable plate 56 relative to the frame 68 may analogously be indicated each by a pointer 70' provided on the two shanks 70, a scale disc 73 being rotatably mounted on the pivot 71, adjacent to the respective shank 70, and having an eccentric pin 74 projecting over the rim 58 of the plate 56.The scale disc 73 is connected, for rotation on the pivot 71, to a milled disc 75 which can be locked by means of a stop nut 76 screwed on the threaded pivot 71 (FIG. 5), so that the pin 74 forms an adjustable abutment with respect to one swivelling direction of the plate 56, while the other disc 73 with its pin 74 is used as an adjustable abutment with respect to the other direction of the same plate.

In the end 77 of each spindle 52 facing the plate 56 is provided an axial conical recess 78 adapted to partly receive the spherical setting head 19 of the rod 17, where the distance between the centers of the two heads 19 (FIG. 2) is equal as that between the inner end faces 77 of the two spindles 52.

To carry the top jaw pattern 36, the upper substantially cross-shaped part 38 of the hinged mechanism (FIGS. 2, 3, 5 and 6) has a bracket 80 or the like, forming the front limb to which the top jaw pattern is detachably secured by means of a bolt 81 and screw nut 82. On the free end of the rear limb 83 is adjustably mounted by means of a clamping screw 90 a bow-shaped slidable piece 89 which carries a hemispherical head 85 projecting forwardly on a shank 84 against the guide face 46 of the guide plate 47, which is intended to cooperate with the guide face 46 in order to provide a rear biting guidance. The radius of the head 85 is equal to the distance of the axis of the spindle 48 from the guide face 46, and the center of the hemispherical head lies in the vertical median plane of the upper part 38 of the hinged mechanism (FIGS. 2 and 6).

From the traverse bar 86 of the upper part 38 there project two ball heads 88 on the corresponding shanks 87 symmetrically in respect of the vertical median plane referred to, against the guide faces 57 of the two plates 56, in order to co-operate with the guide face 57 and the guide faces 64 and 65 of the segments 60 and 61. The radius of the ball head is equal to the distance R.

The upper part 38 which is connected to the lower part 37 by a detachable pulling spring 79, stands with the two ball heads 88 on the plates 56 and is held against tilting upwardly with its limb 83 about the axis going through the centers of the two ball heads 88, which axis represents the "condylar" axis, by the contact of the hemispherical head 85 with the lower face 46 of the plate 47. When releasing the clamping screw 90 the slidable piece 89 can be moved about the above mentioned axis, this adjustment being readable on a scale 89' provided on the piece 89 at a mark 83' provided on the limb 83 (FIG. 2). The distance between the axes of the parallel spindles 48 and 52 is made equal to the distance between the "condylar" axis and middle of the central cutter teeth, wherefore every alteration of the biting height is readable in the real size.

The setting of the guide members of the hinged mechanism according to the recordings obtained is performed in the following manner:

The lower jaw recording frame 12 equipped with the lower jaw pattern 35 is positioned symmetrically to the median plane by being suspended with the two setting heads 19 in the axial bearing recesses 78 of the spindles 52 of the frames 68, whereby the axis of the spindles 52 and the axis through the centers of the heads 19 coincide. The frame 12 is then kept in approximately horizontal position in which the lower jaw pattern 35 is mounted on the base plate 40 by means of plaster. After the plaster has set, the top jaw recording frame or yoke 22 with the top jaw pattern 36 is then set to the recording point corresponding to central occlusion, the ball head 34 resting on the biting plate 10 and the recording styli 24, 25 and 29 resting on the middle and two lateral recording cards 13', 14' and 15'. In this position the recording styli 24, 25 and 29 will be fixed in the corresponding holding tube 23, 30 respectively by means of the screws 28 and 31, so that the tips 24', 25', 29' contact each of the corresponding cards in the recording point belonging to the central occlusion, wherein these tips are each fixed by means of a holding rail. Each holding rail 91 which rests on the recording card 13', 14' or 15', respectively, is lengthwise provided with a slot 93 and at one end with a hole 95 receiving the tip of a stylus 24, 25 or 29 and is mounted on the card-holder 13, 14 or 15 by means of a bolt 92 traversing the card-holder, the recording card and the rail slot and of a wing nut 94 screwed on the bolt, whereby upon loosening the nut the rail 91 is adjustable by lengthwise and rotational displacement for placing the hole 95 upon any point of the recording lines on the card and securing the rail in this desired position by tightening the nut 94 again.

The upper part 38 of the hinged mechanism is set with the ball heads 88 in the center of the guide faces 57 of the plates 56 and with the hemispherical head 85 on the guide face 46 of the plate 47 with the center of the latter head at least approximately in the axis of the spindle 48, and the top jaw pattern 36 is secured by means of plaster on the base plate 80 in the position referred to above (FIG. 3).

If the top jaw recording frame 22 is now set with the tips of the recording styli, on the cards 13', 14' and 15' to the recording points corresponding to frontal biting, the inclination of the guiding face 46 of the plate 47 and that of the axes 71 of the plates 56 may be determined and then secured by means of the screw nuts 49, 53 respectively and be read off on the scale 50, 54 respectively if required. If in the equal manner the frame 22 is set with the recording styli to the recording points corresponding to lateral biting or chewing at the right and left respectively, the appropriate positions of the segments 60, 61 respectively may be secured by means of the screws 62, 63 respectively and the terminal positions of the plate 56 in their pivoting motions about the axes 71 may be secured by means of the abutments 74, and be read off on the corresponding scales 72 and 73 if required.

The recording frames 12 and 22 are then no longer necessary and are therefore separated from the lower and upper jaw patterns respectively. After the preparation of the upper and lower jaw dentures having the contour for mastication which is to be ground on the artificial teeth the dentures are mounted instead of the denture bases 32 and 32' on the lower jaw pattern 35 and the top jaw pattern 36 respectively, and the masication faces of the artificial teeth are ground in a manner known per se by laterally and sagitally reciprocating displacement of the upper part 38 of the hinged mechanism with the ball heads 84 and 88 guided on the guide faces 46, 57, 64 and 65. In doing so, the relative motion produced between the upper part 38 and lower part 37 of the hinged mechanism corresponds to the individual chewing motions of the patient recorded, with inclusion of the resiliency of the upper and lower jaw mucous membrane.

If the setting value for the guide face 46 on the scale 50, the setting values for the guide segments 60 and 61 on the scale 72 (FIG. 5), the terminal positions of the guide face 57 on the scales 73, and the setting of the axis 71 of the guide plate 56 at the right and left on the corresponding scales 54 are specified to a dental technician on delivery of the lower jaw pattern 35 and of the top jaw pattern 36, the said technician will be able to produce a reliable ground-in fit of the mastication contours of the dentures prepared, by means of an identical hinged mechanism adjusted accordingly, independently of the whole device used for recording purposes by the dentist.

It may also be desirable, however, to leave the entire evaluation of the recordings and settings obtained by means of the two recording frames 12 and 22, to the dental technician in the laboratory. To this end, the dental technician will have available an identical pair of recording frames 12 and 22, on which the appropriate denture bases 32, 32' respectively may be mounted in precisely identical position, as secured during the recording operation. Apart from the denture bases, the jaw patterns 35 and 36 to be glued thereto, and the recording cards 13', 14' and 15' bearing the recorded data, as well as the setting values for the ball heads 19 on the scales 16' and 17', will then be supplied to the dental technician. Having these data, as well as the biting height or clearance equally established by means of the set screw 33, the evaluation of the recorded data and the reproduction of the individual masticatory motions, and thereupon the appropriate grinding-in of the mastication contours, may be performed in the laboratory by means of the hinged mechanism described.

Instead of the known auxiliary gauge usually mounted on the front supporting stud of the hinged mechanism for fixing the center line and the height of the biting plane, the present embodiment provides a gauge spike 100 allowing to check the position of every single tooth with respect to the stable region upon mounting (FIGS. 3 and 4).

Heretofore the hinged mechanism is detachably mounted on a plane recording plate 101 which has two pins 102 and a rim 103 all projecting upwardly for securing the foot 39 of the lower part 37 therebetween. The gauge spike 100 is carried in horizontal position on a slide 104 and therewith displaceable on a vertical bar 106 of square section, which is mounted on a foot 105 and carries an altitude scale 108, whereby the spike 100 can be fixed in the desired height by means of a screw 107. The foot 105 carries in a holder 109 a recording stylus 110 in vertical position with respect to a recording sheet 111 lying on the plate 101, the tip of the stylus contacting the sheet surface under the action of a leaf spring 112 exactly in the vertical projection of the tip of the spike 100 onto the sheet 111, while the foot 105 is displaceable on the sheet.

With the described gauge or scanning device particularly the contour of the bead of wax can be recorded on the sheet 111 by means of the spike 100 and of the stylus 110, whereby the altitude value read off the scale 108 is to be noted at the corresponding recording lines or points, in order to ensure the subsequent checking of the denture with respect to the given values.

What I claim is:

1. A device comprising a hinged mechanism for grinding in the mastication contour of artificial teeth and a measuring instrument for recording the individual masticatory motions of a patient, said measuring instrument cooperatively engageable with said hinged mechanism for transferring recorded motions therein, said measuring instrument comprising a frame member arranged to extend fowardly of and transversely across the face of a patient, a lower jaw plate and an upper jaw plate adapted to be fitted into a patient's mouth for measuring masticatory motions, means for mounting said lower jaw plate on said frame, means for mounting said upper jaw plate in masticatory relationship to said lower jaw plate, a first holder disposed in a hoirzontal plane and mounted on said frame in a position aligned forwardly of said lower and upper jaw plates, a pair of second holders mounted on said frame and each disposed on an opposite side of said jaw plates, said second holders extending in vertical planes at substantially right angles to the condylar axis of the patient's jaw and said second holders located in front of the forward surface of said jaw plates, said first and second holders adapted to support recording cards in the plane in which said holders are positioned, marking means mounted on said frame and arranged to mark recording cards supported in said first and second holders, means for locating the condylar axis of the lower jaw of a patient whose masticatory motions are being measured movably positionably located on said frame laterally opposite said jaw plates and rearwardly from said second holders, said means for locating the condylar axis being removably engageable with said hinged mechanism for establishing the position of the condylar axis in said hinged mechanism, means affixed to said support frame and arranged to support a lower and an upper set of artificial teeth in normal masticating relationship, three guide devices mounted in spaced relationship on said support frame and adjustably positionable in accordance with the masticatory motions marked on the recording card in said measuring instrument whereby three dimensional recording of the motions of said lower and upper jaw plates in said measuring instrument are translatable into said hinged mechanism.

2. A device, as set forth in claim 1, wherein said frame member of said measuring instrument comprises a horizontally positioned transverse support element arranged to extend across in front of said saw plates, and a horizontally positioned lateral support secured to and extending substantially normally from said transverse support on each side of said jaw plates and arranged to extend from said transverse support element in the direction facing toward said jaw plates, said first holder secured to said transverse support and extending from it in the direction opposite to said jaw plates.

3. A device as set forth in claim 2, wherein said means for mounting said lower jaw plate comprises a yoke support attached to and extending between said transverse support and said lower jaw plate.

4. A device, as set forth in claim 3, wherein said means for mounting said upper jaw plate comprises a frame element, an adjustably positionable set screw extending between said lower and upper jaw plates for spacing said upper jaw plate relative to said lower jaw plate and establishing the biting height or clearance, and said means for marking recording cards comprises a first tube vertically positioned above said first holder and fixed to said frame element at a position spaced forwardly of said set screw in front of said jaw plates.

5. A device, as set forth in claim 4, wherein said means for marking recording cards comprises a second tube supported intermediate its ends by said frame element for said upper jaw plate and arranged to extend transversely and horizontally across in front of said upper and lower jaw plates between said second holders, a stylus mounted in each end of said second tube and resiliently urged into contact with a recording card held in the adjacent one of said second holders for marking the card.

6. A device as set forth in claim 5, wherein said means for marking recording cards comprises a stylus mounted in said first tube supported in said frame element for said upper jaw plate and arranged to extend downwardly therefrom into contact with a recording card supported in said first holder.

7. A device as set forth in claim 5, wherein means are secured to said styli within said second tube for withdrawing said styli from contacting relationship with recording cards in said second holders in opposition to the resilient force acting on said styli.

8. A device as set forth in claim 7, wherein said means for withdrawing said styli comprises a drawstring attached to said styli near the tips thereof.

9. A device as set forth in claim 2, wherein said means for locating the condylar axis comprises a clamp secured on each of said lateral supports and movably positionable therealong in the direction of the lateral support, a rod positioned in each clamp and arranged perpendicular to said lateral support in the vertical direction corresponding to the upward and downward movement between said upper and lower jaw plates, said rods movably positionable in said clamps in the vertical direction perpendicular to said lateral supports, and a setting head secured to and offset from the axis of each of said rods toward said jaw plates, said setting heads located at the ends of said rods disposed upwardly from said lateral supports, and said setting heads on the opposite sides of said jaw plates arranged to be aligned on the condylar axis of the lower jaw of an individual whose masticatory motions are being measured.

10. A device as set forth in claim 8, wherein a bolt is fixed to each of said first and second holders, a holding rail having a longitudinal slot therein is fitted onto said bolt whereby said holding rail is pivotally and longitudinally positionable on said holder about said bolt, each of said styli cooperating with said holders affixed to the corresponding said holding rail for being positioned therewith, and means for locking said holding rail in position on said holder.

11. A device as set forth in claim 1, wherein said support frame comprises a lower support member and an upper support member, said upper and lower support members movable relative to one another, said lower support member comprising a longitudinally extending foot section, a support plate secured to and extending laterally from said foot section intermediate the ends thereof and arranged to support a lower set of artificial dentures, and three spaced arm supports extending upwardly from said foot section.

12. A device as set forth in claim 11, wherein said three arm supports comprises a pair of first arm supports aligned at the opposite ends of said foot support and a second arm supports disposed between said first arm supports and disposed laterally from a plane extending through said first arm supports and arranged on the opposite side of said foot section from said support plate for the lower set of dentures.

13. A device as set forth in claim 12, wherein said three guide devices comprises a pair of first guide devices each movably attached to a separate one of said first arm supports, and a second guide device movably attached to said second arm support.

14. A device as set forth in claim 13, wherein each of said first guide devices comprises a U-shaped bracket mounted along the bight section thereof on said first support arm for pivotal movement about a horizontal axis disposed perpendicularly to said first support, a circular plate pivotally mounted within said U-shaped bracket and arranged to be pivoted about an axis extending through the outstanding legs of said U-shaped bracket, said circular plate comprising an upwardly facing transverse guide face surface and a pair of guide segments affixed to said upwardly facing face surface.

15. A device as set forth in claim 14, wherein said second guide device comprises an angle plate member pivotally mounted on said second arm support and positionable about a horizontal axis extending perpendicularly to the plane of said second support arm, said angle plate member having a first part disposed in the pivotal plane of said plate member and a second part disposed perpendicularly to said first part and extending therefrom in a direction away from said second support arm.

16. A device as set forth in claim 15, wherein said upper support member comprises a traverse bar extending in the same general direction as a plane extending through said first support arms and having a bracket secured thereto and extending forwardly therefrom for supporting the upper set of artificial dentures, and a limb extending therefrom in the opposite direction from said bracket toward said second support arm and being in alignment with the second part of said angle plate member, an adjustably positionable slide member secured to the end of said limb remote from said traverse bar, and a bolt like member having a hemispherical head thereon movably positionable in said slide member and arranged to extend therefrom into contact with said second part of said angle plate member.

17. A device as set forth in claim 16, wherein a shank is secured to said traverse bar near each of its ends and extends generally downwardly therefrom toward the adjacent one of said first guide devices, a sphere located at the end of each of said shanks remote from said traverse bar and disposed in contacting relationship with the guide face surface of said circular plate, said guide segments mounted on said guide face surface each having a first edge surface and a second edge surface extending from an apex located centrally on said guide face surface, the first edge surface of said guide segments contacting said sphere and the second edge surfaces extending in a plane located through the axis of said sphere, the apices of said segments spaced apart by a dimension equal to the radius dimension of said sphere.

18. A device as set forth in claim 1, wherein translucent recording cards are aranged to be supported on said holders, said recording card having a surface layer consisting of a mixture of chalk and glycerin on said card facing said styli cooperating with said holder, and the marking tip of said styli being formed of aluminum.

References Cited
UNITED STATES PATENTS

| | | | |
|---|---|---|---|
| 2,814,876 | 12/1957 | Stuart | 32—19 |
| 3,056,210 | 10/1962 | De Pietro | 32—20X |
| 3,078,584 | 2/1963 | Cohn | 32—20X |
| 3,343,264 | 9/1967 | Guichet | 32—32 |
| 3,452,439 | 7/1969 | Lee | 32—32 |

FOREIGN PATENTS

| | | | |
|---|---|---|---|
| 731,864 | 6/1955 | Great Britain | 32—32 |

ROBERT PESHOCK, Primary Examiner